March 19, 1957 L. B. SMITH ET AL 2,785,836
LIQUID DISPENSER
Filed Feb. 27, 1953 3 Sheets-Sheet 1

INVENTOR.
Lloyd B. Smith
BY Leon M. Leathers.
ATTORNEYS

March 19, 1957 L. B. SMITH ET AL 2,785,836
LIQUID DISPENSER
Filed Feb. 27, 1953 3 Sheets-Sheet 2

INVENTOR.
Lloyd B. Smith
Leon M. Leathers
BY
ATTORNEYS

March 19, 1957

L. B. SMITH ET AL 2,785,836

LIQUID DISPENSER

Filed Feb. 27, 1953

INVENTOR.
Lloyd B. Smith
BY Leon M. Leathers

ATTORNEYS

United States Patent Office 2,785,836
Patented Mar. 19, 1957

2,785,836

LIQUID DISPENSER

Lloyd B. Smith, Birmingham, Ala., and Leon M. Leathers, Athens, Ga., assignors to L. M. Leathers' Sons, Athens, Ga., a partnership Application February 27, 1953, Serial No. 339,335

19 Claims. (Cl. 222—146)

This invention relates to a liquid dispenser and more particularly to a dispenser for dispensing individual quantities of liquid from a bulk source of liquid wherein it is extremely important that the liquid being dispensed be kept cool and free from contamination.

A dispenser constructed in accordance with the teaching of the present invention has been found to have particular utility for dispensing individual quantities of milk from a bulk source of milk and a preferred embodiment of the present invention is therefore described in relation to its use as a milk dispenser although, as will be apparent to those skilled in the art, the teaching of the present invention may be applied to the dispensing of liquids other than milk where the problems involving sanitation, etc., are essentially the same as for milk.

There are, of course, numerous types of customer-operated dispensers or vending machines now on the market for dispensing or vending many different types of articles, including liquids. The dispensing of bulk milk, however, by means of a customer-operated dispenser such as a coin-actuated vending machine poses particular and difficult problems. These problems arise chiefly because milk spoils so easily and may be readily contaminated if unprotected. Because it is such an important food, the handling and sale of milk is subject to close regulation by governmental authorities who impose rigid requirements upon those who produce and sell milk to the public.

Stated one way, the problem is to get the milk from the producer to the customer uncontaminated and fresh. For packaged or bottled milk it is obvious that this is not nearly so difficult as it is in the case of bulk milk. A vending machine may contain enough bulk milk for several hundred individual portions to be dispensed. From the time that the bulk milk is placed into the dispenser until the last measure is drawn, it is essential that the milk be free at all times from contamination and that it be kept fresh.

This gives rise to such requirements as insuring that once the bulk milk is placed in the dispenser, it is free from contamination by customers who draw milk from the dispenser; that contamination cannot occur at the discharge orifice of the dispenser either by having foreign matter fall into a glass or other receptacle used by the customer to obtain the milk or by having a person's fingers reach the milk delivery orifice; and that the milk shall be refrigerated at the proper temperature at all times. It is thus seen that the matter of the discharge orifice of such a dispenser is a very important factor in whether the dispenser will be able to meet rigid requirements imposed by regulatory bodies. This is further apparent when it is considered that all of the milk being dispensed passes through the discharge orifice and at least a part of the discharge orifice is exposed to the open air.

Still another problem to be considered is the necessity of being able to readily and thoroughly clean and sterilize component parts of the dispenser so that the dispenser may be used again and again to dispense the bulk milk without contamination.

It is accordingly an object of the present invention to provide a new and improved dispenser for dispensing individual quantities of liquid from a bulk source of liquid where it is extremely important that the liquid being dispensed be kept cool and free from contamination. Further objects of the present invention are to provide such a dispenser wherein component parts of the dispenser may be readily and thoroughly cleaned to permit re-use of the dispenser for dispensing liquid without contamination; to provide such a dispenser wherein the liquid will be kept at the proper temperature at all times while it is in the dispenser and is being dispensed therefrom; to provide an improved means of discharging the liquid from the dispenser and preventing contamination at the discharge means; and to provide an improved means for controlling the starting and stopping of liquid flow so that successive equal portions of liquid may be dispensed from the dispenser.

The foregoing objects are attained in a preferred embodiment of the present invention useful for dispensing individual measured quantities of bulk milk as follows: The dispenser comprises a cabinet or casing having a hollow interior into which is placed a bulk milk container from which the individual portions of milk are to be drawn. The cabinet is of a type adapted to be placed so that the front of the cabinet faces the customer and the rear of the cabinet faces away from the customer. In other words, the cabinet could be placed in a wall dividing a restaurant area from a kitchen area with the front of the cabinet facing the restaurant area and the rear of the cabinet facing the kitchen area. Beneath the cabinet or casing is a tunnel extending from front to rear. The front opening of the tunnel is flared and the customer can thus place a glass or other receptacle within the tunnel and below the casing in order to catch the milk being dispensed. The persons who service the dispenser have access to the tunnel area from the rear of the cabinet.

The bottom wall of the cabinet or casing which is immediately above the tunnel has a vertical opening extending through the wall near the front of the casing and a sanitary fitting or bushing is seated in this opening and defines the discharge orifice or delivery opening of the dispenser. This fitting or bushing has a relatively large open mouthed bell shaped cavity extending from the bottom of the sanitary fitting up into the body of the sanitary fitting. A delivery passage extends through the body of the sanitary fitting from the upper end of the cavity to the upper surface of the sanitary fitting. A flexible delivery tube has its delivery end positioned within this delivery passage and its other end connected to the bulk milk container. The fluid flow is thus by gravity from the bulk milk container through the discharge sanitary fitting, the actual point of exit of the milk from the casing being recessed within the bottom wall of the casing and thus being relatively inaccessible from the exterior of the casing.

The cabinet or casing walls are insulated and suitable cooling means are provided to keep the interior of the casing at the proper temperature. In addition, cooling coils may be located adjacent to and surround the opening through which the sanitary fitting or bushing extends and thus provide a cool region at the very point of discharge of the milk from the dispenser. This is an important feature for both lessening contamination and keeping the milk fresh.

A drip tray is slidably mounted immediately beneath the bottom wall of the casing and is positioned below the sanitary fitting or bushing so as to catch condensate which may form on the sanitary fitting due to the coolness thereof. The drip tray is provided with an opening located in registry with the enlarged opening of the sanitary fitting cavity so that the milk may pass through the tray to the customer's receptacle which is placed beneath the tray. The upper edge of the drip tray extends above the lower end of the sanitary fitting whereby the drip tray cannot be removed from within the tunnel unless the sanitary fitting is lifted upwardly through the opening in the bottom casing wall. This further prevents contamination of the discharge sanitary fitting since the drip tray itself makes it difficult for one to reach up into the interior of the sanitary fitting or bushing with his fingers when the drip tray is in position as described.

In operation, the customer actuates the dispenser by a suitable means such as a coin controlled mechanism which releases the flexible delivery tube from a pinched-off position to an open position long enough for a predetermined quantity of milk to flow from the bulk container to the customer's receptacle located below the discharge orifice. The control mechanism pinches off the delivery tube to stop the flow at the proper time and the customer then removes the receptacle from within the tunnel. In this manner successive portions of milk may be drawn from the dispenser until the supply is exhausted in the bulk container. Since the milk flows by gravity from the bulk container to the customer's receptacle, it is apparent that the level of the milk in the bulk container will drop as successive measures are dispensed. In order to insure that equal portions will be dispensed as the liquid level falls in the bulk container, the control mechanism allows the liquid to flow for a longer time in each succeeding dispensing operation so that equal portions will be dispensed throughout operation of the dispenser. When the supply is exhausted in the bulk container, an attendant will then remove the empty bulk container and replace it with a full bulk container and a new delivery tube. If it is desired to clean the dispenser before placing a full bulk container in it, the sanitary fitting or bushing can be lifted from within the opening in the bottom wall of the casing and the drip tray can be slid back through the tunnel to the rear side and removed for cleaning. To facilitate cleaning the interior of the cabinet or casing, corners of the interior walls are rounded.

Other objects and advantages of the present invention will become more apparent from the following detailed description taken in conjunction with the attached drawings wherein.

Figure 1:
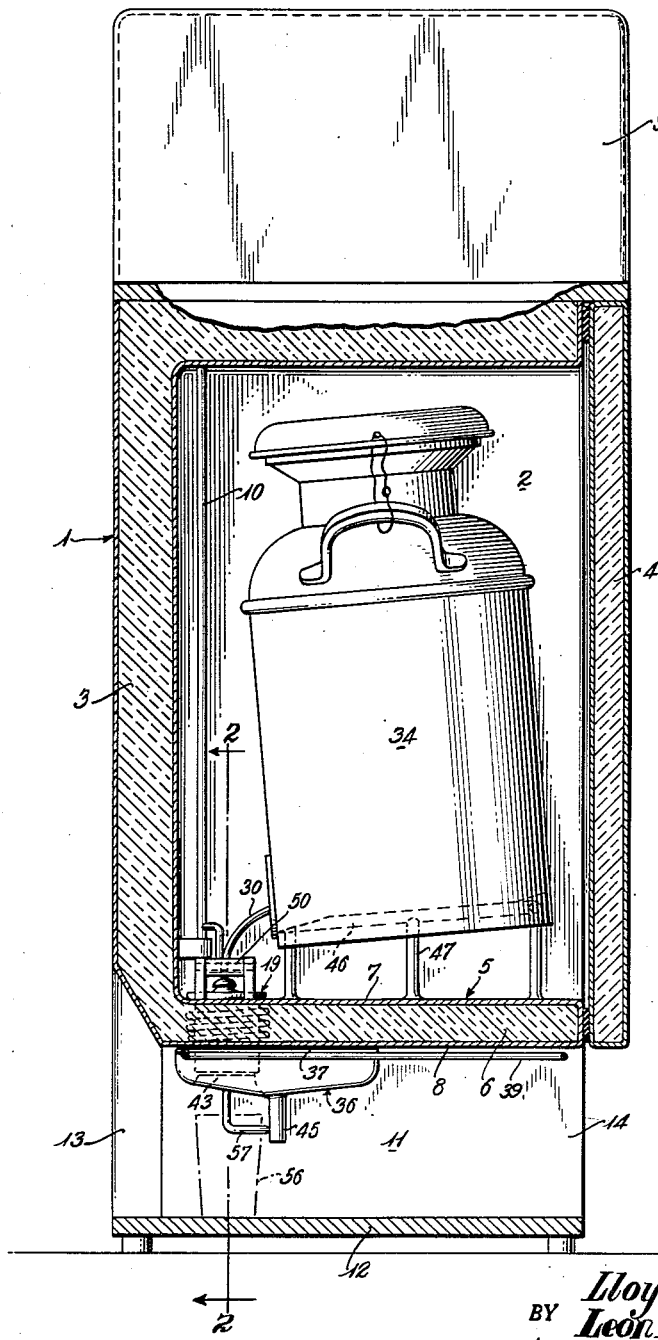
Fig. 1 is a side elevation view, partly in section, of a preferred embodiment of the liquid dispenser constructed in accordance with the teaching of the present invention.

Referring to Fig. 1, there is shown a cabinet or casing designated generally by the reference numeral 1 having a hollow interior space 2 defined by front and back, top and bottom, and side walls. The front wall is indicated at 3, the rear wall is indicated at 4 and the bottom wall is indicated at 5. In order to enable the proper temperature to be maintained in space 2, all of the casing walls are preferably insulated with a suitable insulating material. Thus, bottom wall 5 has insulation 6 sandwiched between the interior facing 7 and the exterior facing 8 of the wall. Wall portions 7 and 8 are preferably made of metal such as stainless steel whereby they may be readily cleaned and will present an attractive appearance. All of the other casing walls which define space 2 are preferably constructed like bottom wall 5 in that they have insulation sandwiched between stainless steel inner and outer wall members.

Top portion 9 located above the hollow interior 2 houses control mechanism for causing the dispenser to deliver a predetermined quantity of milk. Inasmuch as this control mechanism is not per se the present invention the mechanism is not shown, it being understood any suitable mechanism for achieving the desired result may be located within top portion 9. The control mechanism actuates a shaft or rod 10 in a manner described hereinafter to regulate starting and stopping of the flow of milk from the dispenser to the customer so that the proper amount of milk is dispensed in each successive dispensing operation even though the level of the milk in the bulk container drops as successive portions are dispensed.

A tunnel 11 extends from front to rear of the cabinet being located below bottom wall 5 and above base portion 12 as shown in Fig. 1. Tunnel 11 has a front opening 13 and a rear opening 14 whereby access may be had to the tunnel from either front or rear.

Figure 3:
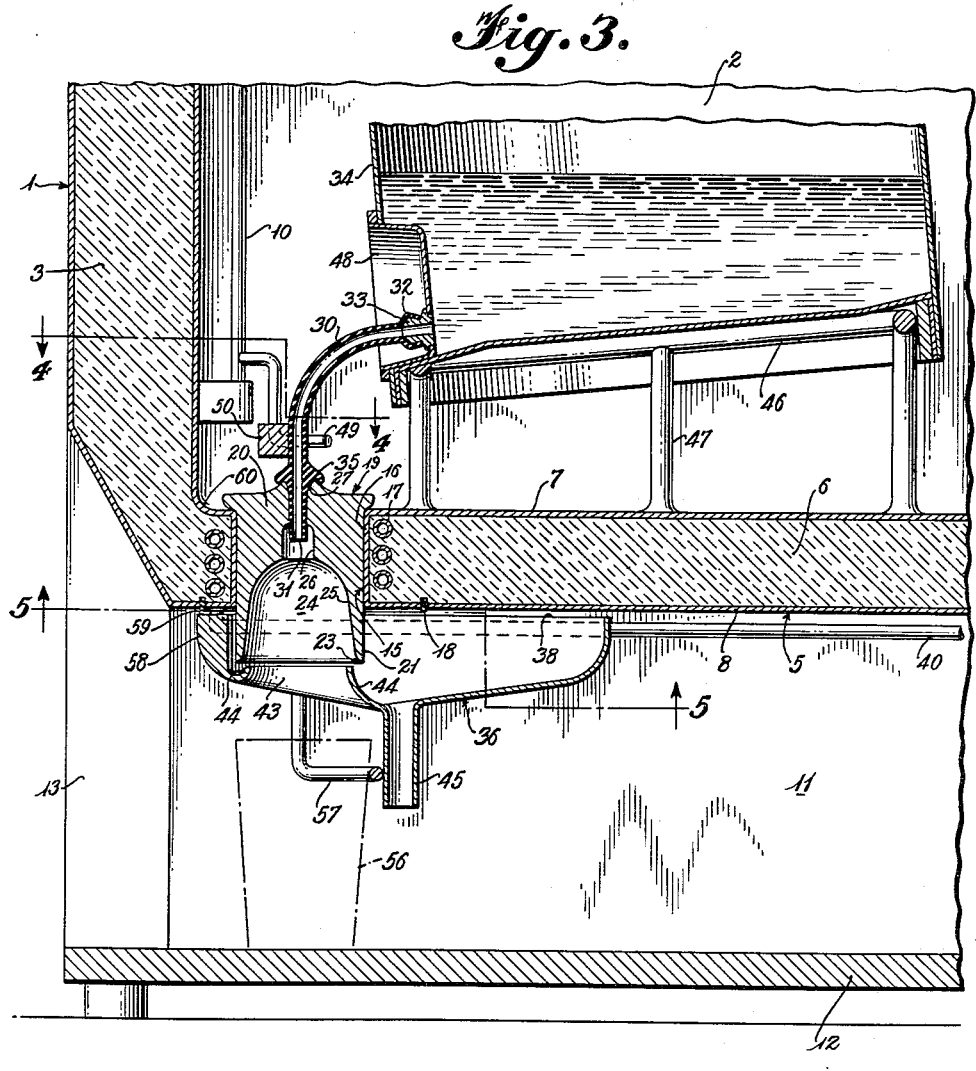
Fig. 3 is a sectional view taken on line 3—3 of Fig. 2.

Bottom wall 5 has a vertical opening 15 extending completely therethrough, see Fig. 3, this opening being located adjacent front wall 3. Opening 15 is defined by a tubular wall portion 16, which is preferably a continuation of the inner and outer stainless steel wall members 7 and 8 as shown in Fig. 3. Opening 15 is also preferably a cylindrical opening.

A plurality of cooling coils 17 are located in bottom wall 5 adjacent to and surrounding opening 15. These coils are preferably hollow type coils through which a suitable refrigerant may be circulated from a source not shown. As can be seen from the drawings, the coils are preferably concentric with opening 15 and extend substantially throughout the depth of the opening so that the opening is well enveloped by the coils. It is thus apparent that there will be a cool zone located at opening 15 when a refrigerant is circulated through cooling coils 17.

Figure 2:
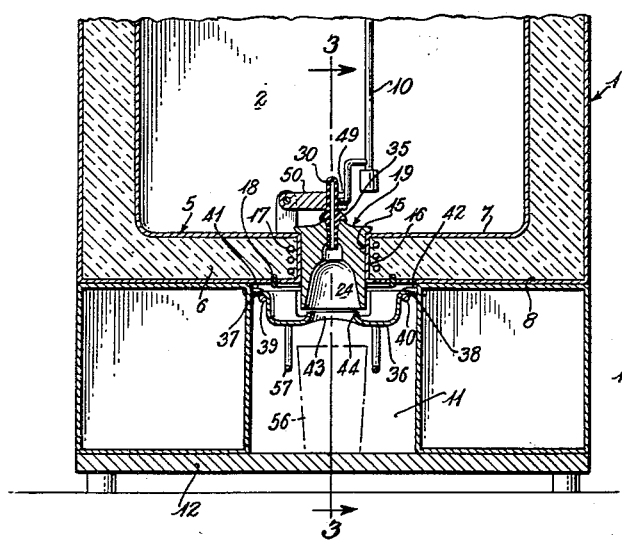
Fig. 2 is a sectional view taken on line 2—2 of Fig. 1.
Figure 5:
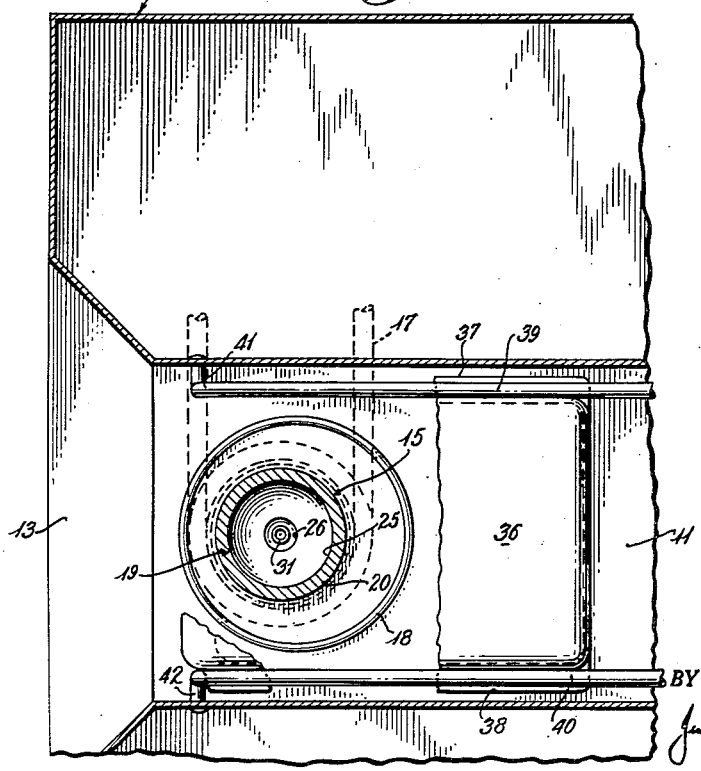
Fig. 5 is a bottom plan view taken on line 5—5 of Fig. 3.
Figure 7:
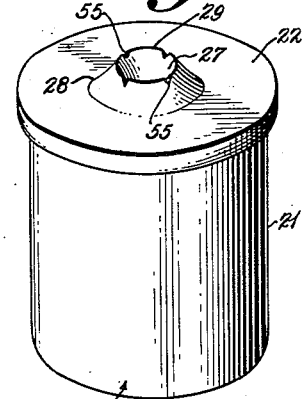
Fig. 7 is an exterior view of the sanitary fitting or bushing shown in Fig. 6.

In order to further confine the cool zone at opening 15, an external baffle or gasket 18 surrounds opening 15 and extends through the exterior metal wall member 8 as shown in Figs. 2, 3 and 5. This baffle may be made of rubber or other suitable material. It reduces the tendency for moisture to collect on the underside of the casing since it impedes heat transfer through metal wall 8 toward opening 15.

A sanitary fitting or bushing, indicated generally by the reference numeral 19, is positioned in opening 15 and extends completely through wall 5 from beyond the interior wall member 7 to beyond the exterior wall member 8. Sanitary fitting 19 comprises a tubular body member 20 having an exterior side surface 21 conforming closely to the surface of wall member 16 which defines opening 15. In a preferred embodiemnt wherein opening 15 is a cylindrical opening, the body member 20 of sanitary fitting 19 will also be cylindrical in shape with the outer surface 21 being closely adjacent to the surface of wall member 16 which defines opening 15. In other words, the outer diameter of body portion 20 of the sanitary fitting will be slightly less than the inner diameter of opening 15 whereby the sanitary fitting may be lifted from within opening 15 in order to be removed therefrom.

When the sanitary fitting is positioned in opening 15 as shown in the drawings, it is supported in what can be described as suspended relation by an annular flange 22 which projects from the upper end of body 20 and rests upon the portion of wall member 7 located immediately about opening 15. It is therefore evident that the outer diameter of body portion 20 and flange 22 together is greater than the inner diameter of opening 15. It is also evident that this manner of support enables the sanitary fitting to be readily lifted out of opening 15 when so desired.

The lower end of the sanitary fitting extends downwardly below opening 15 and terminates in a lip 23 which defines the mouth of an enlarged cavity 24. This cavity extends upwardly into the sanitary fitting body from the lower end of the sanitary fitting. Cavity 24 is defined by an inner flared wall 25 which is so shaped that the cavity is substantially bell-shaped in cross-section as viewed in Figs. 2, 3 and 6.

Figure 6:
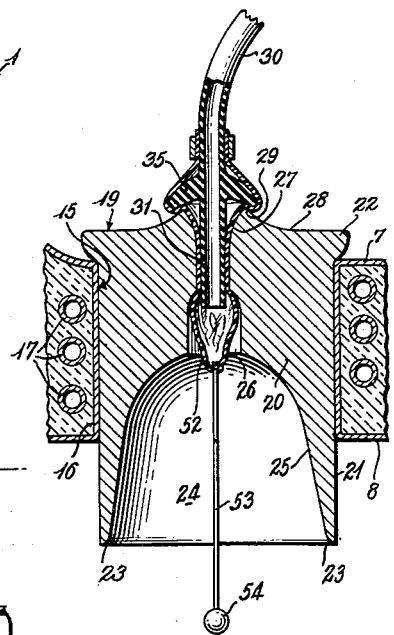
Fig. 6 is an enlarged sectional view in elevation showing the improved sanitary fitting or bushing positioned in the bottom casing wall in accordance with a preferred embodiment of the present invention and wherein the delivery end of the flexible delivery tube has a protective covering.

A delivery passage 26 extends through the sanitary fitting body from the upper end of cavity 24 to the upper end of the sanitary fitting body and opens at a flared mouth 27. The upper surface 28 of the sanitary fitting body tapers uniformly down on all sides from mouth 27 thus producing, in effect, a crater edge 29 which defines mouth 27. Delivery passage 26 preferably includes an enlarged portion immediately adjacent the top of cavity 24 and a restricted portion extending from this enlarged portion to mouth 27 as shown in Figs. 2, 3 and 6.

A flexible delivery tube 30 has an open delivery end 31 located within delivery passage 26 and, in fact, end 31 is preferably located within the enlarged portion of passage 26 located adjacent the top of cavity 24. The other end 32 of the delivery tube is positioned over a fitting 33 which extends from the bulk milk container 34 and enables milk to flow, by gravity, from container 34 to delivery tube 30. Tube 30 has an annular flange or hood 35 projecting from the tube adjacent the delivery end 31 of the tube. As shown in Figs. 3 and 6, hood 35 engages and overlies edge 29 which defines mouth 27 of delivery passage 26 and thus prevents any foreign matter from falling into or otherwise entering passage 26 from above. Delivery tube 30 may be made of rubber, the object being to provide a tube having the necessary flexibility and strength to provide an adequate fluid delivery conduit extending between the milk container 34 and sanitary fitting.

A tray, indicated generally by the reference numeral 36, is positioned below bottom wall 5 and sanitary fitting 19. This tray may be referred to as a drip tray since its primary purpose is to collect condensate, etc. which may form on the sanitary fitting and the bottom wall adjacent the sanitary fitting and prevent it from falling into the customer's receptacle. As has been mentioned previously, wall members 7 and 8 and also the wall member 16 which defines opening 15 are all preferably stainless steel wall members and thus subject to having moisture condense thereon when they are cooled. Sanitary fitting 19 is also preferably made entirely of metal, such as aluminum.

Tray 36 has a pair of upper side edge portions 37 and 38 which support the tray on a pair of parallel rods or rails 39 and 40 which are located adjacent the exterior side of bottom wall 5 as shown more particularly in Figs. 1 and 2. The forward ends 41 and 42 of rails 39 and 40, see Fig. 5, are bent upward to act as stops for the tray when it is slid forward in tunnel 11. Thus, when the tray is in its forward position, as is shown in the drawings, the upper edge portion 37 and 38 of the tray may engage the upturned ends 41 and 42 of the rails.

When tray 36 is in its forward position as just described, it is in position to collect condensate as mentioned above. It is also in position wherein opening 43 in the bottom of the tray, which is defined by an upwardly flaring wall 44, is located beneath sanitary fitting cavity 24 and centered with respect thereto so that the tray does not interfere with flow of milk from the delivery end 31 of tube 30 to a customer's receptacle. In fact, as can be seen best from Fig. 3, the size of opening 43 and the slope of the tray wall portion 44 are such that opening 43 is large enough not to interfere with the flow of milk, and yet condensate which may collect on the inner flared wall 25 of cavity 24 will still have a chance to drip into the tray and be collected thereby. In other words, the upper edge of wall portion 44 is set in enough with respect to sanitary fitting lip 23 so that the tray is actually located beneath the sanitary fitting lip. Condensate collected by drip tray 36 is discharged therefrom through a spout portion 45.

When it is desired to load the dispenser, the rear wall 4 is moved out of the way and the bulk milk container 34 placed on stand 46 supported by legs 47 which extend upward from bottom wall 5 of the casing. Stand 46 is preferably sloped so that the milk container 34 will rest in slightly tilted position to facilitate draining the contents thereof.

The milk container shown in Figs. 1 and 2 is of generally conventional shape except that it is provided with a pocket 48 adjacent the bottom edge thereof and within which fitting 33 is located from which delivery tube 30 extends. Prior to the time when the milk container is placed in the dispenser, the delivery tube is coiled within pocket 48, having been previously fitted over fitting 33, and pocket 48 is covered by a suitable cover which protects the coiled-up delivery tube. Also, a suitable means is provided for sealing off the delivery tube so that milk will not flow therethrough before it should.

After the milk container 34 has been mounted on stand 46 and the cover removed from pocket 48 to expose delivery tube 30, the delivery end 31 of the delivery tube is positioned within delivery passage 26.

Figure 4:
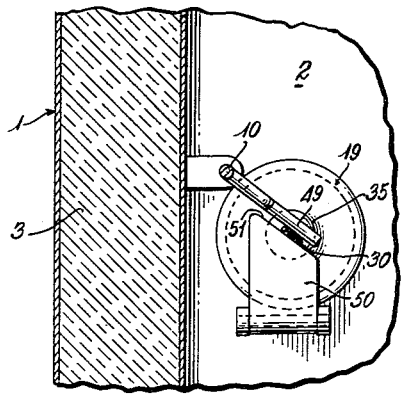
Fig. 4 is a sectional view taken on line 4—4 of Fig. 3.

Flow of milk through the delivery tube is preferably controlled by an arrangement which includes an arm portion 49 which extends from adjacent the lower end of rotatable rod 10 and a block portion 50 which is positioned with respect to arm 49 so that when the latter is swung toward the block it will compress tube 30 against the block and thus pinch it off to prevent flow of milk through the tube. This can be observed in Fig. 4 wherein arm 49 is shown pressing tube 30 against surface 51 of block 50. It is obvious that by suitable advance and release of arm 49 the flow of milk through tube 30 may be controlled as desired. Thus, by suitable apparatus, not shown, located in the top portion 9 of the cabinet or casing, it is possible to time the action of arm 49 in relation to block 50 so as to deliver predetermined amounts of milk. In other words, even though the level of the milk in the bulk container drops thus reducing the pressure causing flow through delivery tube 30 the timing apparatus can compensate for this by controlling the action of arm 49 in relation to block 50 to permit the milk to flow for a longer period of time in each succeeding dispensing operation so that equal portions of milk will be dispensed throughout the operation of the dispenser. In the case of a coin controlled apparatus, the amount of milk constituting a given measure could be determined by the denomination of the coin deposited in the dispenser.

When the delivery end 31 of the delivery tube is initially placed within delivery passage 26, the delivery end is preferably covered by a protective covering such as the covering 52 shown in Fig. 6. The protective covering may take other forms than that shown in Fig. 6, the important point being that the delivery end is protected from exposure until the cover is removed. To accomplish removal of the cover, a draw string 53 extends down and terminates in a button 54 which may be grasped to yank the string and pull the cover 52 off or the end 31 of the delivery tube. To facilitate removal of cover 52, the crater edge 29, which defines the mouth 27 of passage 26, may be made relatively sharp and provided with a plurality of spaced apart notches 55. Cover 52 extends upward from end 31 of tube 30 to and over hood 35 as shown in Fig. 6. Thus, when hood 35 is pressed down against edge 29 and twisted, the notched edge 29 will tend to cut and thus weaken the cover at this location. Then, by yanking or pulling on string 53, the whole cover located beneath the hood can be drawn downward and away from the delivery end of the delivery tube. Cover 52 will be made of suitable material, plastic material for example, so that it can be removed in the manner described.

After the delivery end 31 of the delivery tube is properly positioned in the sanitary fitting, arm 49 is advanced to squeeze tube 30 against block 50 and thus prevent flow of milk through the tube until it is intended that milk should flow. Then when the delivery end is uncovered and the drip tray is in position, as shown in the drawings, the dispenser is ready for operation.

In operation, the customer places his glass or other receptacle beneath opening 43 in the drip tray. A glass 56 is indicated in dot and dash lines and the correct position for the glass is determined by a guide rod 57 against which the glass may be placed. When so placed, the glass will be substantially vertically below delivery end 31 of the flexible delivery tube 30 and thus be in position to receive the milk. By turning rod 10 by a suitable apparatus controlled by a means such as a coin-responsive means, the customer causes arm 49 to release its grip on tube 30 and permit a predetermined quantity of milk to flow from container 34 into glass 56. Naturally the measure will be such in most instances as to provide the customer with a full glass of milk. Arm 49 cuts off flow of milk through tube 30 when the right amount of milk has been delivered and the customer then withdraws the glass and the dispenser is ready for another customer. The cycle is repeated until container 34 is emptied whereupon the dispenser may be unloaded and then reloaded in the manner described above.

In view of the shape of the sanitary fitting or bushing 19, particularly the shape of the enlarged cavity 24 located therein, milk flows from the delivery end of delivery tube 30 without any of the milk actually touching the sanitary fitting. Condensate collecting on tube 30 may run over hood 35 and onto the upper surface 28 of sanitary fitting 19. The slope is such that such condensate or other foreign matter will tend to flow away from mouth 27 of delivery passage 26 and thus not enter the passage. Condensate which may collect on exterior wall surface 21 of the sanitary fitting will run into the drip tray. It is thus apparent that the shape of the sanitary fitting and the location of the delivery end 31 of the delivery tube with respect thereto are such as to effectively guard against having foreign matter of any type drop into the customer's glass while milk is being dispensed.

When the drip tray 36 is in position during operation of the dispenser so that the drip tray collects condensate and other matter which may drop into it, the forward end 58 of the drip tray is located in front of the lower end of sanitary fitting 19 and the upper edge 59 of this forward end is located above lip 23 of the sanitary fitting. It is therefore apparent that if one attempted to slide tray 36 to the rear along rails 39 and 40 the forward end 58 of the tray would strike the sanitary fitting and prevent this. In fact, and as can be observed from Fig. 3, forward end 58 is a thickened portion having the requisite strength to prevent it from being damaged if it is inadvertently moved against sanitary fitting 19. Having the tray and sanitary fitting arranged in this manner insures that the tray will not be removed unless the sanitary fitting is lifted up so that the tray can clear the sanitary fitting. When the tray is in position it, in addition to the shape of the sanitary fitting, guards against having anyone reach up into the interior of the sanitary fitting with his fingers and thus guards against contamination occurring in this manner.

The dispenser, including component parts thereof, may be readily cleaned. Thus, assuming that the milk container 34 has been removed from the dispenser and that delivery tube 30 has been separated from sanitary fitting 19, the sanitary fitting can then readily be lifted from within opening 15 in order to clean it and the opening and replace the sanitary fitting in position. When sanitary fitting 15 is so lifted drip tray 36 may be slid to the rear of the tunnel 11 and removed from the tunnel so that it too can be cleaned. Finally, the interior walls of the casing, such as wall 7, which define space 2 can be cleaned by reaching into the interior from the rear of the casing. Interior corners 60 are rounded to facilitate cleaning. All component parts of the dispenser are thus designed to be kept as sanitary as possible.

It will be apparent from the foregoing description that a liquid dispenser constructed in accordance with the teaching of the present invention has sanitary and cooling features which give the dispenser particular utility as a dispenser for dispensing individual portions of milk from a bulk source of milk. The bulk source of milk, i. e., the milk contained in bulk container 34 is housed in a refrigerated casing having insulated walls whereby the milk, in bulk, is maintained at the proper temperature. In this connection, while no particular cooling means is shown for cooling the interior space 2 of casing 1, it is to be understood of course that such space will be kept cool by any suitable refrigeration means. The provision of cooling coils 17 surrounding the discharge sanitary fitting 19 provides a cool zone at the very point of discharge of milk from the dispenser and therefore naturally aids in maintaining sanitation at this important part of the dispenser.

Bushing 19 may be referred to as a sanitary fitting since its shape provides sanitary features for protecting the milk from being contaminated as it is discharged from the dispenser. Since sanitary fitting 19 is preferably made of solid aluminum having relatively smooth interior and exterior surfaces it can be readily cleaned individually and will maintain its cleanliness in normal usage of the dispenser.

While we have described a preferred embodiment of our invention, we wish it to be understood that we do not intend to be restricted solely thereto but that we do intend to cover all modifications thereof which would be readily apparent to one skilled in the art and which come within the spirit and scope of our invention.

We claim:

1. In a liquid dispenser useful for dispensing individual quantities of bulk milk, a casing including an external wall having a sanitary fitting extending therethrough, said sanitary fitting having an enlarged cavity opening to the exterior of said casing wall and having a delivery passage opening into said enlarged cavity, said delivery passage opening being recessed from the exterior of said casing wall whereby said opening is relatively inaccessible from said casing wall exterior, a flexible delivery tube extending from said sanitary fitting to the interior of said casing, said delivery tube having a delivery end located within the delivery passage of said sanitary fitting, and a cooling coil positioned within said external casing wall adjacent to and surrounding said sanitary fitting.

2. In a liquid dispenser useful for dispensing individual quantities of bulk milk, a substantially horizontal wall having an upper surface and a lower surface, a sanitary fitting extending substantially vertically through said wall, said sanitary fitting having an enlarged cavity opening downwardly with respect to the lower surface of said wall and also having a delivery opening communicating with said cavity at the top of the cavity, and a flexible delivery tube extending upwardly from said sanitary fitting, said delivery tube having a delivery end positioned within the delivery opening of said sanitary fitting.

3. In a liquid dispenser useful for dispensing individual quantities of bulk milk, a substantially horizontal wall having an upper surface and a lower surface, a sanitary fitting extending substantially vertically through said wall from above the upper surface of the wall to below the lower surface of the wall, said sanitary fitting having an enlarged cavity opening downwardly with respect to the lower surface of said wall and also having a delivery opening communicating with said cavity at the top of said cavity, cooling means positioned within said wall between the upper and lower surfaces of said wall, said cooling means surrounding said sanitary fitting, and a heat transfer baffle located at the lower surface of said wall, said baffle interrupting the lower surface of said wall and surrounding said sanitary fitting.

4. In a liquid dispenser useful for dispensing individual quantities of bulk milk, a casing including a substantially horizontal bottom wall having an upper interior surface and a lower exterior surface and also having a substantially cylindrical opening extending through said wall from said interior surface to said exterior surface, a sanitary fitting including a substantially cylindrical body portion having an upper end and a lower end and an annular flange extending from said body portion at the upper end thereof, the outer diameter of said body portion and flange being greater than the diameter of said opening and the outer diameter of said body portion being less than the diameter of said opening, said sanitary fitting being positioned in suspended position in said opening with the sanitary fitting flange overlying and contacting the interior surface of said casing wall about said opening and the lower end of the body portion of the sanitary fitting being located below the exterior surface of said casing wall, said sanitary fitting body portion having an enlarged cavity therein extending upwardly into the sanitary fitting body portion from the lower end of said body portion and a delivery passage extending through said sanitary fitting body portion from the upper end of said cavity to the upper end of said body portion.

5. In a liquid dispenser according to claim 4, cooling means positioned within said wall adjacent to and surrounding said opening.

6. In a liquid dispenser useful for dispensing individual quantities of bulk milk, a casing including a substantially horizontal bottom wall having an upper interior surface and a lower exterior surface and also having an opening extending through said wall from said interior surface to said exterior surface, a sanitary fitting positioned in said opening and extending through said casing wall, said sanitary fitting having an upper end located above the interior surface of said casing wall and a lower end located below the exterior surface of said casing wall, said sanitary fitting also having an enlarged cavity therein extending upwardly into the body of the sanitary fitting from the lower end of the sanitary fitting and a delivery passage extending vertically through the sanitary fitting from the upper end of said cavity to the upper surface of said sanitary fitting, said sanitary fitting upper surface being a sloped surface defining a crater shaped mouth for said delivery passage, and a flexible delivery tube having a delivery end positioned within said delivery passage, said tube extending from said sanitary fitting into the interior of the casing.

7. In a liquid dispenser according to claim 6, a flange extending from and about said delivery tube and overlying the crater shaped mouth of said delivery passage to prevent foreign matter from entering said passage.

8. In a liquid dispenser useful for dispensing individual quantities of bulk milk, a casing including a substantially horizontal bottom wall having an upper interior surface and a lower exterior surface and also having an opening extending through said wall from said interior surface to said exterior surface, a sanitary fitting positioned in said opening and extending through said wall, said sanitary fitting having an upper end located above the interior surface of said wall and a lower end located below the exterior surface of said wall, said sanitary fitting also having an enlarged cavity extending upwardly into the sanitary fitting from the lower end of the sanitary fitting and a delivery passage extending through the sanitary fitting from the upper end of said cavity to the upper end of the sanitary fitting, a delivery tube extending from said sanitary fitting into the interior of the casing, said delivery tube having a delivery end located in said delivery passage, and a removable protective covering surrounding the delivery end of said delivery tube.

9. In a liquid dispenser useful for dispensing individual quantities of bulk milk, a casing including a substantially horizontal bottom wall having an upper interior surface and a lower exterior surface and also having an opening extending through said wall from said interior surface to said exterior surface, a sanitary fitting positioned in said opening and extending through said wall, said sanitary fitting having an upper end and a lower end and also having an enlarged cavity extending upwardly into the sanitary fitting from the lower end of the sanitary fitting and a delivery passage extending through the sanitary fitting from the upper end of said cavity to the upper end of said sanitary fitting, a flexible delivery tube having a delivery end positioned within said delivery passage, said tube extending from said sanitary fitting into the interior of the casing, and means located within said casing and adjacent to said sanitary fitting to pinch said tube to prevent flow of liquid through said tube.

10. A sanitary fitting for use in a liquid dispenser useful for dispensing individual quantities of bulk milk, said sanitary fitting comprising a metal body having an upper end and a lower end, the outer side surface of said body being cylindrical in shape and the lower end of said body being a lip defining the mouth of an enlarged bell-shaped cavity extending upwardly into the sanitary fitting from the lower end of the sanitary fitting, a delivery passage extending axially through said body from the upper end of said cavity to the upper surface of said body, and an annular flange projecting from said body at the upper end thereof, the upper surface of said body being a sloped surface which slopes from the peripheral edge of the flange radially inwardly and upwardly to meet the upper end of said delivery passage to form an annular ridge which is spaced upwardly from the plane of said peripheral edge.

11. In a liquid dispenser useful for dispensing individual quantities of bulk milk, a substantially horizontal wall having an upper wall member and a lower wall member, said wall members being spaced apart and the space between them being filled by a heat insulating material, said substantially horizontal wall also having an opening extending completely through said wall from said upper wall member to said lower wall member, said opening being bounded by a substantially vertical wall, a sanitary fitting positioned within said opening, said sanitary fitting having a delivery opening communicating with an enlarged cavity defined by an inner wall of said sanitary fitting extending downwardly from said delivery opening, and cooling means embedded within said heat insulating material adjacent to said horizontal wall opening and said sanitary fitting, said sanitary fitting being readily removable from within said horizontal wall opening.

12. In a liquid dispenser useful for dispensing individual quantities of bulk milk, a casing including an external wall having an opening extending therethrough, a flexible delivery tube having a delivery end positioned within said opening, said delivery end being spaced inwardly from the exterior of said casing wall whereby the delivery end is relatively inaccessible from the exterior of the casing, a thin readily detachable protective covering surrounding the delivery end of said delivery tube, said protective covering having a closed end likewise spaced inwardly from the exterior of said casing wall, and a draw string extending from the closed end of said protective covering.

13. A spout assembly useful for discharging liquid from a bulk-liquid container and preventing said liquid from being contaminated while it is being discharged, said spout assembly comprising an elongated flexible delivery tube having an inlet end and a delivery end and a fluid-flow passage extending from said inlet end to said delivery end, said inlet end being attachable to a bulk-liquid container and a sanitary fitting positioned about said delivery end, said sanitary fitting including a body portion having a passage extending centrally therethrough, the delivery end of said tube being located within said passage, and an enlarged flared cavity communicating with said passage and extending in extension of said passage whereby the delivery end of said tube is recessed within said sanitary fitting.

14. A spout assembly useful for discharging liquid from a bulk-liquid container and preventing said liquid from being contaminated while it is being discharged, said spout assembly comprising an elongated hollow cylindrical flexible tube having an inlet end and a delivery end, said inlet end being attachable to a bulk-liquid container, said tube having an annular flange extending from and surrounding said tube adjacent the delivery end of the tube, a sanitary fitting including a cylindrical body having an upper end and a lower end, an inner wall extending from the lower end of said body upwardly into said body and defining an open-mouthed cavity within said body, and a passage extending axially through said body from the upper end of said cavity to the upper end of said body, the delivery end of said flexible tube being located within said passage whereby said delivery end is relatively inaccessible from the lower end of said sanitary fitting, said tube flange being in contact with the upper end of said sanitary fitting body.

15. In a liquid dispenser useful for dispensing individual quantities of bulk milk, a casing including an external wall having an opening extending therethrough, a flexible delivery tube having a delivery end positioned within said opening, said delivery end being spaced inwardly from the exterior of said casing wall whereby the delivery end is relatively inaccessible from the exterior of the casing, and a thin readily detachable protective covering surrounding the delivery end of said delivery tube, said protective covering having a closed end likewise spaced inwardly from the exterior of said casing wall.

16. In a liquid dispenser useful for dispensing individual quantities of bulk milk, a casing including an external wall having a sanitary fitting extending therethrough, said sanitary fitting having a passage extending therethrough from the interior of the casing, a flexible delivery tube having a delivery end located in said passage, said delivery end being spaced inwardly from the exterior of said casing wall whereby said delivery end is relatively inaccessible from the exterior of said casing wall, and a thin readily detachable protective covering surrounding the delivery end of said delivery tube, said protective covering also being located in said sanitary fitting passage and having a closed end spaced inwardly from the exterior of said casing wall.

17. In a liquid dispenser useful for dispensing individual quantities of bulk milk, a casing including an external wall having a sanitary fitting extending therethrough, said sanitary fitting having a delivery opening communicating with an enlarged cavity defined by an inner wall of said sanitary fitting extending outwardly from said delivery opening, said delivery opening being recessed from the exterior of said casing wall whereby said opening is relatively inaccessible from said casing wall exterior, and a flexible delivery tube extending from said sanitary fitting to the interior of said casing, said delivery tube having a delivery end located loosely within the delivery opening of said sanitary fitting, said delivery tube end being spaced inwardly from the exterior of said casing wall and being readily removable from within said delivery opening.

18. In a liquid dispenser useful for dispensing individual quantities of bulk milk, a casing including a substantially horizontal bottom wall having an upper interior surface and a lower exterior surface and also having a substantially vertical opening extending through said wall from said interior surface to said exterior surface, and a tubular sanitary fitting having a body portion telescoped within said opening, said body portion having a passage extending downwardly from the top of the body portion and communicating with an inner flared wall flaring outwardly from the lower end of said passage to the lower end of the body portion to define an enlarged cavity positioned in extension of said passage, and said body portion also having a flange projecting from the body portion at the upper end of the sanitary fitting and resting upon the interior surface of said casing wall about said opening to support said sanitary fitting with respect to said opening, said sanitary fitting being freely removable from said opening.

19. In a liquid dispenser useful for dispensing individual quantities of bulk milk, a casing including an external wall having a sanitary fitting extending therethrough, said sanitary fitting having a delivery opening communicating with an enlarged cavity defined by an inner wall of said sanitary fitting extending outwardly from said delivery opening, said delivery opening being recessed from the exterior of said casing wall whereby said opening is relatively inaccessible from said casing wall exterior, a flexible delivery tube extending from said sanitary fitting to the interior of said casing, said delivery tube having a delivery end located within the delivery opening of said sanitary fitting, and cooling means positioned within said external casing wall adjacent to said sanitary fitting.

References Cited in the file of this patent

UNITED STATES PATENTS

| | | |
|---|---|---|
| 252,759 | Goodyear | Jan. 24, 1882 |
| 1,038,021 | Summers | Sept. 10, 1912 |
| 2,104,990 | Hoefler | Jan. 11, 1938 |
| 2,215,968 | Livingston | Sept. 24, 1940 |
| 2,291,256 | Rehrig et al. | July 28, 1942 |
| 2,324,337 | Jomsland | July 13, 1943 |
| 2,337,261 | Norris | May 29, 1945 |
| 2,431,058 | Manning | Nov. 18, 1947 |
| 2,545,812 | Hosford | Mar. 20, 1951 |
| 2,549,207 | Kestenbaum | Apr. 17, 1951 |
| 2,558,887 | Tesiero | July 3, 1951 |
| 2,601,319 | Norris et al. | June 24, 1952 |
| 2,608,335 | Rohdin | Aug. 26, 1952 |